Nov. 7, 1950   J. O. THORSHEIM   2,529,116
MOTOR CONTROL SYSTEM
Filed March 12, 1947   3 Sheets-Sheet 1

INVENTOR.
JOSEPH O. THORSHEIM
BY
George H. Fisher
ATTORNEY

Nov. 7, 1950        J. O. THORSHEIM        2,529,116
MOTOR CONTROL SYSTEM
Filed March 12, 1947                                3 Sheets-Sheet 2
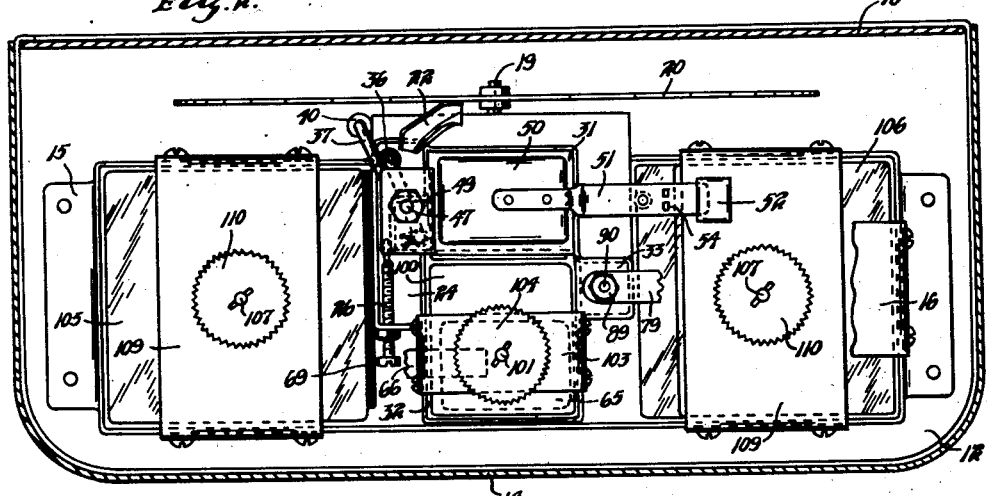
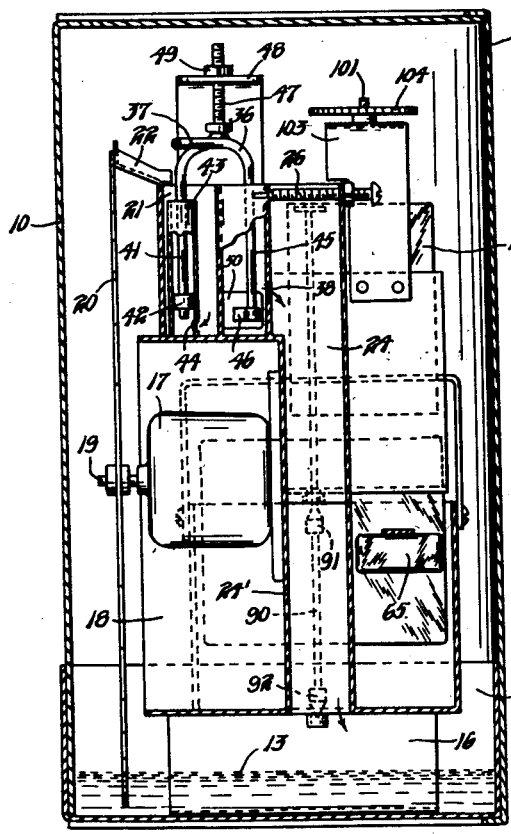
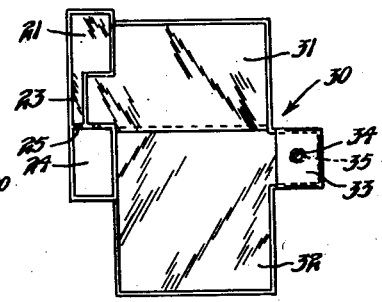
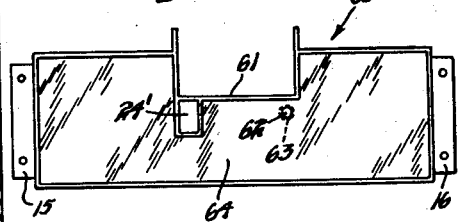
INVENTOR.
JOSEPH O. THORSHEIM
BY
George H. Fisher
ATTORNEY

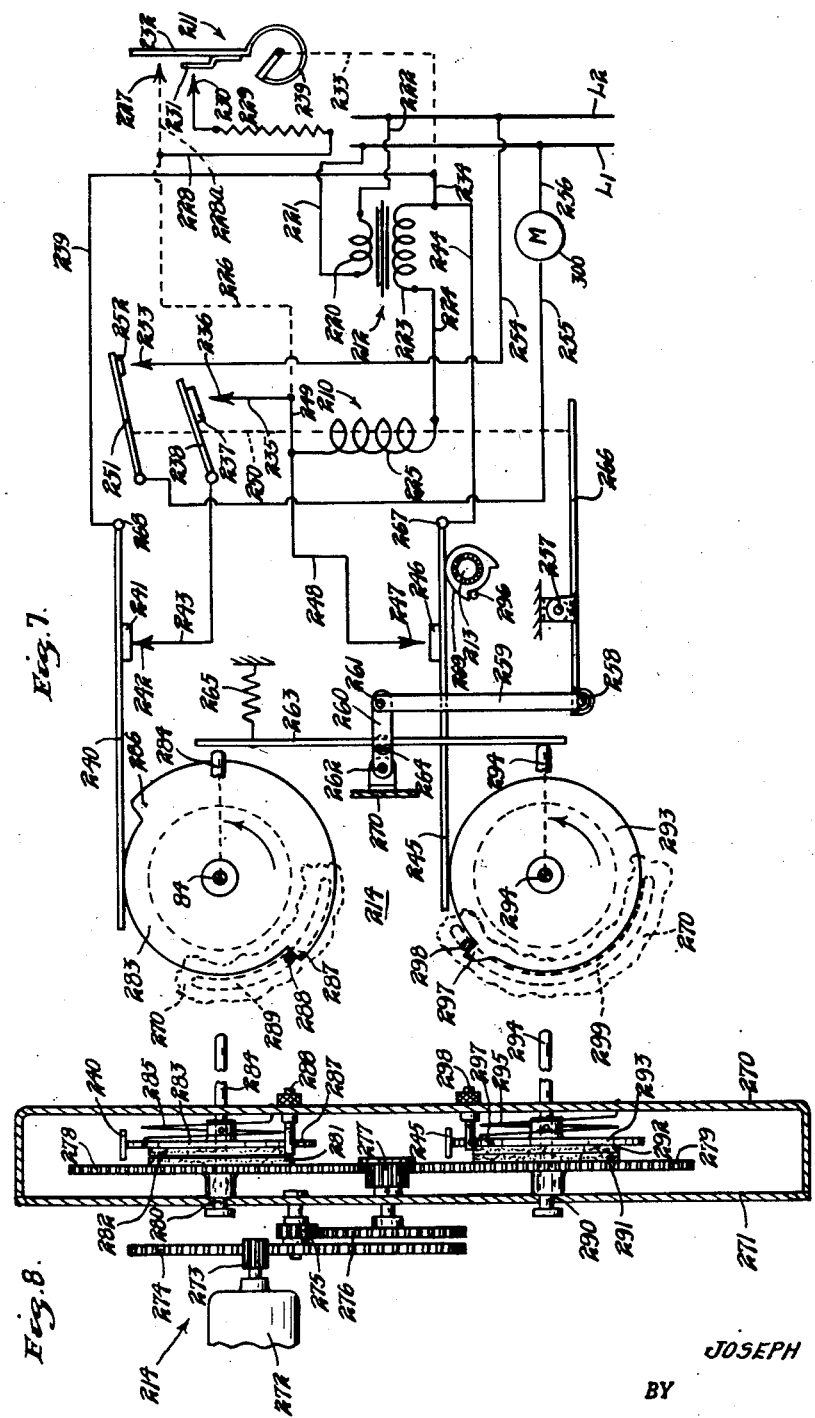

Patented Nov. 7, 1950

2,529,116

UNITED STATES PATENT OFFICE 2,529,116

MOTOR CONTROL SYSTEM

Joseph O. Thorsheim, Minneapolis, Minn., assignor to Minneapolis-Honeywell Regulator Company, Minneapolis, Minn., a corporation of Delaware Application March 12, 1947, Serial No. 734,042

19 Claims. (Cl. 318—485)

The present invention relates to improved timing apparatus especially adapted for controlling solid fuel stokers. Proper control of stokers, as well as certain industrial processes, requires apparatus capable of causing timed operation of a control device yet permitting operation of the said device by an independent condition responsive means. Based on such requirements, the present apparatus comprises readily adjustable timing means capable of causing operation of a control device according to a predetermined cyclic program, yet permitting operation of said device by an independent condition responsive means at any time, and with termination of the operation of the device by the condition responsive means always restoring the timing apparatus to control at a predetermined point in its program cycle.

It is therefore an object of this invention to provide improved timer apparatus.

It is a further object to provide improved timer apparatus operable in a predetermined manner and capable of being overruled by a condition responsive means.

It is an additional object to provide timer apparatus for controlling a device according to a cyclic program but which permits a condition responsive means to assume control of said device at any time and wherein the timing apparatus resumes control of the device at a predetermined point in its cyclic operation upon termination of control by the condition responsive means.

It is also an object to provide timer apparatus for "on" and "off" control of a device wherein one timing means is provided for timing the "off" period of the device and another timing means is provided for timing the "on" period.

It is a further object to provide timing apparatus for controlling a plurality of control means wherein the timing mechanism may comprise either mechanical or hydraulic apparatus.

A more specific object comprises providing timer apparatus including a relay and two timing means driven by a single motor wherein one or the other of the timing means may be rendered inoperative by clutch means operated by the said relay.

A like object comprises providing timer apparatus including a relay and two timing means operated by a single motor wherein one or the other of the timing means may be rendered inoperative by valve means operated by the said relay.

It is a still more limited object to provide timer apparatus comprising two timer means selectively rendered operative or inoperative by clutch means, wherein each of the timer means can be operated only to a limited extent and wherein each of said timer means is promptly restored to initial position when it is rendered inoperative by the said clutch means.

It is a similar object to provide timer apparatus comprising two means selectively rendered operative or inoperative by valve means, wherein each of the timer means can be operated only to a limited extent and wherein each of the said timer means is promptly restored to initial position when it is rendered inoperative by said valve means.

It is an object to provide hydraulic timing apparatus which functions by filling a container with liquid at a predetermined rate of flow sufficient to operate a control device when a predetermined level is reached and wherein the timed period is ended by valve means operated as a result of the functioning of the said control device.

It is also an object to provide hydraulic apparatus wherein a predetermined uniform rate of flow of a known liquid is obtained by syphoning the liquid from a constant level container and wherein unknown liquids may be tested by observing the rate of flow obtained by such a syphon.

It is an additional object to provide sequential hydraulic timing means comprising a constant flow means discharging into a series of containers wherein the flow from one container to another is controlled by valve means operable as a function of a predetermined liquid level being reached in said one container.

It is a further object to provide improved fluid handling means for a hydraulic timing apparatus or the like comprising a disk rotatable in the liquid to be handled and collecting means for removing the liquid from the disk.

It is another object to provide a liquid actuated timing device which includes a plurality of liquid receiving chambers in which a plurality of intervals may be obtained by the time required for the liquid to successively fill each of the chambers to a predetermined level.

It is also an object to provide hydraulic timing means wherein the "on" time can be varied without varying the cycle time and the cycle time can be varied without varying the "on" time.

It is a further object to provide a liquid timing apparatus of the sort described capable of cyclically providing timed intervals of different lengths wherein each class of the timed intervals may be individually adjusted as to the said lengths.

It is a further object to provide a control system including apparatus of the sort described and temperature responsive means for controlling the operation of a solid fuel stoker.

It is an additional object to provide an improved control system for stokers and the like including timer apparatus incorporating simple and effective electrical circuits.

These and other objects will become apparent upon an inspection of the following specification and drawings wherein:

Figure 2 is a plan view of the device of Figure 1, the outer housing being in section.

Figure 3 is a sectional view taken on the line 3—3 of Figure 1.

Figure 4 is a plan view of one of the liquid container means shown in part in Figures 1 to 3.

Figure 5 is a plan view of another liquid container shown in part in Figures 1 to 3.

Figure 7 is a schematic showing and wiring diagram of a modification of the apparatus of Figures 1 to 6.

Figure 8 is an end view of the mechanical timing apparatus schematically shown in Figure 7, with parts in section.

Figure 1:
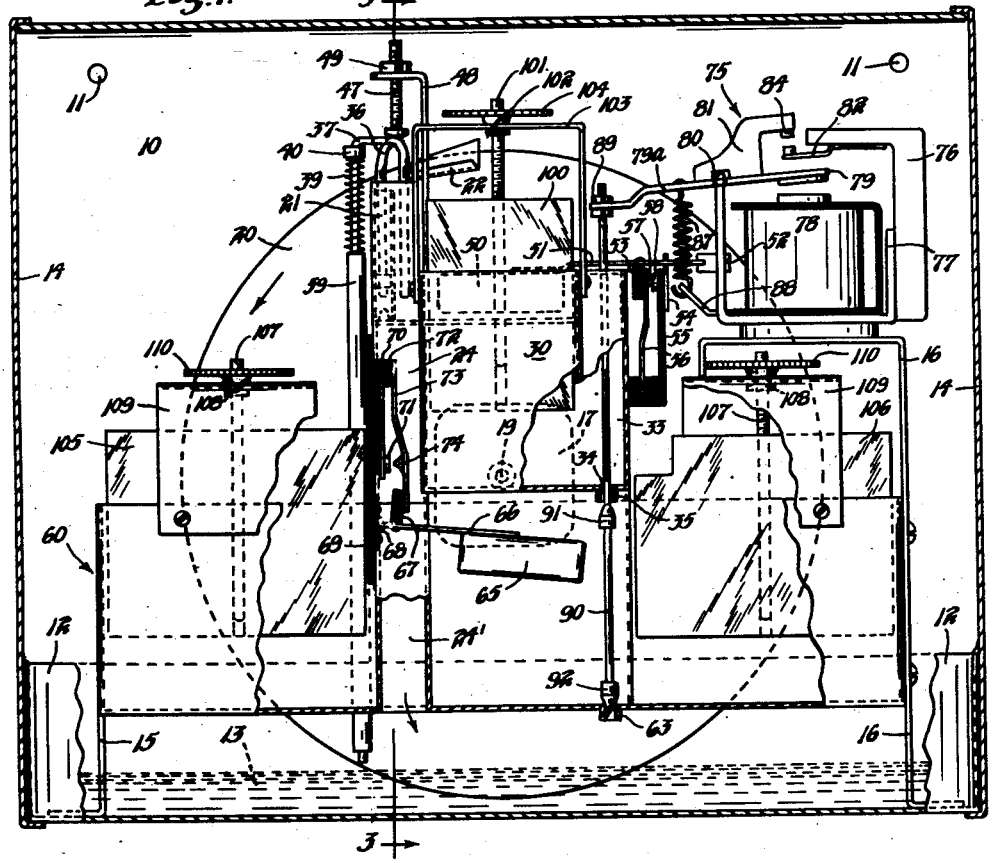
Figure 1 is a front elevation of the present liquid timing means, parts being broken away.

Referring to the drawings, the present timing mechanism is contained within a housing having a back plate 10, a pan-like bottom 12, and a removable cover 14. The pan-like bottom 12, in addition to being a portion of the housing of the present mechanism, also serves as a sump or reservoir for the hydraulic liquid used in the present mechanism. The timer mechanism as a whole is supported on brackets 15 and 16 which are secured to the bottom of reservoir 12 and support the said mechanism far enough above the highest liquid level of 12 to permit free drainage into the same. The present mechanism includes liquid chambers 30 and 60, as well as other mechanism to be described.

Liquid chamber or pan 60 is attached directly to the brackets 15 and 16 and forms the lower part of the present hydraulic apparatus. This pan, shown in part in Figures 1 to 3 and shown in plan view in Figure 5 (reduced in scale relative to the other figures) is generally rectangular in shape but has a narrowed intermediate portion 64 caused by the recessed wall portion 61, the recessed portion 61 being provided to make room for motor means, to be described. An opening 62 is formed in the bottom of pan 60 and is connected to a short insert tube or sleeve 63, best shown in Figures 1 and 5, the insert 63 being used as a valve seat in a manner which will appear. Also, a passageway 24' is formed in pan 60 and connects with an overflow passage 24 of chamber means 30. Pan 60 is proportioned to have a relatively large liquid volume, and displacement plug means 105 and 106 are provided for lowering into pan 60 to provide decreased liquid capacity for the said pan. Plug means 105 and 106 are adjustably carried by threaded shafts 107, shafts 107 being rotatably mounted in brackets 109 and restrained from axial movement by collars 108 and adjusting wheels or handles 110. Rotation of handles 110 causes plugs 105 and 106 to be easily raised or lowered as desired. Obviously, when the plugs are lowered into the pan 60, they necessarily displace an equivalent amount of liquid and thereby diminish the liquid capacity of the pan.

Also associated with pan 60 is a float 65 attached to a lever 66 pivoted at 68 to an insulating base member 69. Lever 66 has attached thereto an insulating block 67 arranged to bear against a resilient switch arm 73 carrying a contact 74. Contact 74 is engageable with a contact 71 carried on a switch blade 70, switch blades 70 and 73 being insulated from each other at their upper ends by block 72. The switching means just described is mounted on the insulating base 69 which is suitably secured to the present timing mechanism. The float is so adjusted that contacts 71 and 74 are normally separated due to block 67 being rotated against resilient switch blade 73 by the depressed float 65. However, when the liquid in chamber 60, under conditions to be described, rises to a predetermined level, float 65 is raised and moves the upper end of block 67 to the left so that contact 74 is permitted to engage contact 71.

Liquid chamber 30 is located just above chamber 60 and is secured thereto. Chamber 30 comprises a main or deep portion 32 having an off-set portion 33, and further includes a shallow portion or float chamber 31. An insert or sleeve 35 provided at the bottom of off-set portion 33 has an opening 34 for drainage purposes, sleeve 35 comprising a valve seat, as will appear.

A float 50, as noted in Figures 1 and 2, is attached to an arm 51 which is pivotally secured to a bracket 54 mounted on an insulating block 55. An over-hanging portion of arm 51 carries a counterweight 52 for nearly balancing the weight of float 50 so that the float need displace very little liquid to operate. An insulating block 53 is secured to arm 51 in a position so that, when float 50 is low, switch contact 57, carried on resilient switch blade 56, will be held in engagement with a contact 58 mounted on the insulating block 55. Thus, switch contacts 57 and 58 are normally held engaged by block 53, but the switch blade 56 is resiliently urged to the left to disengage the contacts when permitted by float 50 being raised to a predetermined level to moving block 53 away from blade 56.

To provide means for adjusting the volume of liquid that can be contained in chamber 30, a displacement plug 100 is threadedly mounted on a screw shaft 101 which is rotatable by a suitable wheel-like handle 104, the present adjusting means being supported over main portion 32 of chamber 30 by a bracket 103. A wheel 104 and collar 102 cooperate to prevent axial movement of screw 101.

A constant level liquid chamber 21 is conveniently made part of chamber 30 and, as will be noted in Figures 1 and 3, chamber 21 extends above chamber 30. Chamber 21 connects through passage 23 with a relatively high overflow opening 25 which discharges into overflow conduit 24. When assembled as shown in Figures 1 and 3, overflow passage 24 is in registry with passage 24' of chamber 60 to thus form a continuous overflow passage opening into sump 12. An adjustable screw 26 is provided for projecting into opening 25 to thereby prevent the forming of a meniscus by the liquid in chamber 21 which might tend to slightly raise the level maintained in the chamber.

A siphon means including a siphon tube 36 is provided for transferring the hydraulic liquid from chamber 21 into chamber 30 at a constant rate. Siphon tube 36 is adjustably secured in operative position by an angular arm 37 slidably mounted in tube 59, as noted in Figure 1 of the drawing. A spring 39 surrounding arm 37 and bearing against collar 40 tends to hold the siphon tube 36 in a raised position, but an adjusting screw 47 carried by bracket 48 limits the height to which the siphon tube 36 can be raised by the spring. A lock nut 49 is provided for screw 47 for maintaining the desired adjustment. The left leg 41 of siphon tube 36 extends into a tube 43 located in chamber 21. A piston-like collar 42 is secured to the lower end of leg 41 and is slidable in the tube 43. An opening 44 located near the bottom of tube 43 permits fluid to flow from chamber 21 into the branch 41 of the siphon. The right branch 45 of siphon tube 36 extends slightly into chamber 30 but preferably above the highest liquid level obtainable in the chamber 30. A U-shaped clip 46 is secured to the bottom of leg 45 to prevent surface tension from preventing the starting of the siphonic action. Reference is made to my copending application, Serial No. 544,317, filed July 10, 1944, for a more complete disclosure of the present siphon means.

As thus far described, it is noted that a pan-like hydraulic chamber 60 is mounted above a sump or reservoir 12, chamber 60 being provided with a float controlling a switch which is normally open, but which is closed when liquid in the chamber 60 rises to a predetermined level. Mounted above chamber 60 and in substantial registry therewith is chamber 30, chamber 30 being sufficiently far above chamber 60 to permit a complete drainage of liquid from chamber 30 through opening 34 and sleeve 35 to chamber 60 under conditions to be described. Chamber 30 also is provided with a float operated switch in which the contacts 57—58 are normally closed, but which contacts are opened when liquid in chamber 30 rises to a predetermined level and operates float 50. Chamber 21, termed the constant level chamber, and conveniently made part of chamber 30, is located far enough above the high liquid level of chamber 30 to permit siphonage or drainage thereinto.

It is now pointed out that sleeve 63 in chamber 60 and sleeve 35 in chamber 30 are so aligned that valve member 92, for coacting with sleeve 63, and valve member 91, for coacting with sleeve 35, can be mounted on a common rod 90 for simultaneous operation so that valve 91 is moved out of engagement with insert 35 when valve 92 is moved into engagement with sleeve 63, and so that fluid flow may take place through sleeve 63 when flow through sleeve 35 is prevented by valve 91. Valve rod 90 is attached as at 89 to an extension 79a of a relay armature 79, the relay being of the electromagnetic type and generally designated by the numeral 75. Relay 75 is mounted on an extension of bracket 16 and comprises, in addition to the aforesaid armature 79, a bracket 77 to which armature 79 is pivotally attached at 80, a winding 78, an insulating bracket portion 76 carrying stationary contacts 82 and 83, an insulating block 81 attached to armature 79 and carrying contacts 84 and 85, and a biasing spring 87 attached to extension 79a of the armature and to bracket 88 for biasing the armature and contacts 84 and 85 in an opening direction, and as a consequence biasing valve member 92 into engagement with sleeve 63. While any suitable relay capable of controlling a plurality of independent circuits can be used, the relay disclosed in Wilson Patent #2,241,838 has been found readily adaptable to the present purpose.

A simple and effective pump is provided for lifting the hydraulic liquid from sump 12 to constant level chamber 21. This pump comprises a disc 20 mounted on shaft 19 of electric motor 17, the disc being of sufficient diameter to dip into the liquid 13 in sump 12 at the bottom and to raise the liquid which adheres to the periphery of the disc to a point above the top of the constant level chamber 21. A suitable scoop or scraper 22 is arranged to lightly bear against disc 20 in a manner to scrape off the adhering liquid and divert it into the aforementioned chamber 21. With the liquid used in a successful model of the present device, which liquid comprised a petroleum fraction of low viscosity and high viscosity index mixed with a light and highly refined lubricating oil, it was found that a disc about 5 inches in diameter worked nicely at about 200 R. P. M., the disc dipping into liquid 13 about one-half inch.

In addition to the present timing means, relay 75 may be controlled by a room thermostat 112 or the like (Fig. 6) in a manner which will appear. The thermostat 112 comprises bimetal 125 and switch blades 126 and 127 engageable with stationary contacts 124 and 120, respectively, contact means 126—124 being the first to make and the last to break. A thermostat having only a single set of contacts may also be used, if desired, for the present timing means acts to establish its own holding circuit.

A transformer 115 comprising a primary winding 116 and a secondary winding 117 is provided so that reduced voltage may be used for the control circuits, to be described.

To complete the disclosure of the present invention, and to show the coaction of the present timing means with a thermostat for controlling a stoker, its operation will now be described.

*Operation*

Figure 6:
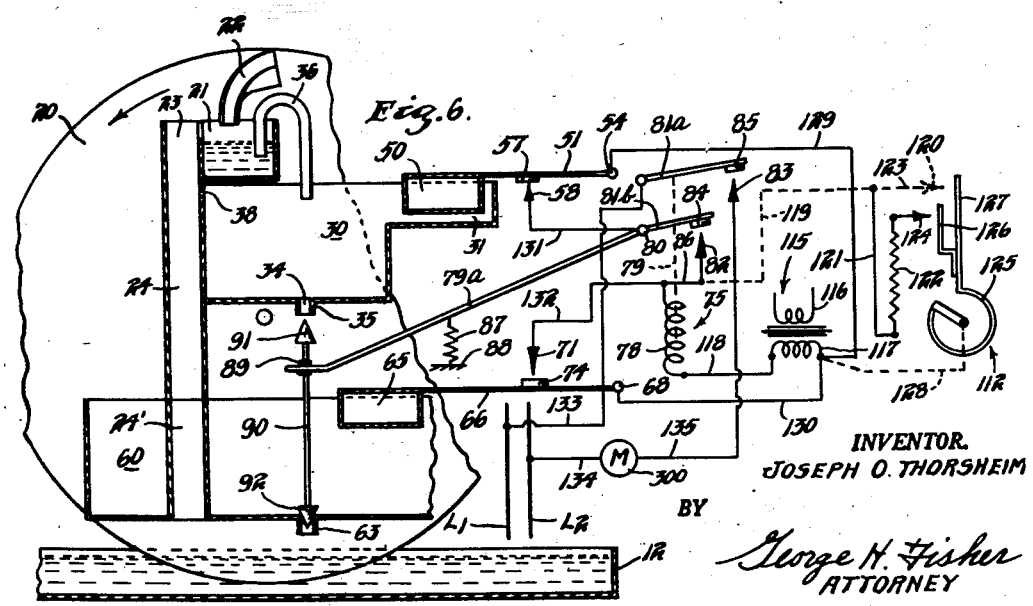
Figure 6 is a schematic showing and wiring diagram of the present apparatus.

Referring especially to Figure 6, the present apparatus may be put in operation by energizing line wires L1 and L2, it being considered that this energizes primary winding 116 of transformer 115 and motor 17 by circuits not shown. With the transformer 115 energized, secondary winding 117 is capable of supplying low voltage current for the present control circuits and motor 17 operates to rotate disc 20. Further, it may be assumed that the temperature affecting the room thermostat is sufficiently high that the thermostat contacts are open. It should be remembered that this figure shows the apparatus schematically, and the arrangement and proportion of the parts are at the most only suggestive.

Under these conditions, wheel 20, due to its dipping into liquid 13, picks up and carries some of the liquid along its peripheral surfaces. Then, as the liquid surfaces are rotated past scraper 22, the liquid is diverted or scraped from the disc and directed into the constant level chamber 21. Assuming that siphon 36 is not operating because of air trapped in its upper portion, when the liquid pumped into chamber 21 reaches a sufficiently high level, it passes through passage 23 and discharges through opening 25 into drain 24, through which it is returned to sump 12. As before noted, due to the projecting of screw 26 into opening 25, a meniscus is prevented from forming at this opening. As previously related, it is noted that fluid passage is permitted through insert 35 while sleeve 63 is plugged by valve 92 but as no liquid is being siphoned from chamber 21, no liquid is being supplied to either chambers 30 or 60.

Siphon 36 may now be placed in operation by sharply thrusting it downwardly (see Figure 3). When this is done, collar 42 acts as a piston and, due to the inertia of the liquid in the bottom of tube 43 and the slight restriction of flow outwardly through hole 44, the liquid is forced upwardly through branch 41 of the siphon sufficiently to drive the air out and start the siphon action. The siphon can then be released so that it will be forced back to its adjusted position by spring 39. It is noted that clip 46 on the bottom of siphon branch 45 prevents surface tension from interfering with the flow of the liquid from branch 45 in a manner described in my co-pending application, previously referred to. With siphon 36 now operating, and assuming that its height has been regulated by screw 47 so that it discharges a desired flow, such as approximately 4 cc., of liquid per minute, this liquid is discharged into chamber 30 but, because of valve means 91 being disengaged from insert 35, the liquid flows through chamber 30 into chamber 60 wherein it accumulates since insert 63 is plugged by valve 92. Assuming that displacement plugs 105 and 106 have been adjusted in chamber 60 to require 200 cc., for instance, of liquid to raise float 65 sufficiently to engage contacts 74 and 71, it will now take 50 minutes for chamber 60 to be filled to this level.

Upon chamber 60 being filled to the aforementioned level so that switch contacts 74 and 71 engage, it is noted, referring to Figure 6, that relay 75 is energized by the circuit: secondary winding 117, wire 130, pivot 68, arm 66, contact 74, contact 71, wire 132, relay winding 78, wire 118 and secondary winding 117. Energization of relay 75 pulls in armature 79 and thus causes engagement of contacts 84 and 85, carried by switch arms 81b and 81a, respectively, with their respective stationary contacts 82 and 83. This causes stoker motor 300 to be energized by the circuit: line wire L1, wire 133, switch blade 81a, contact 85, contact 83, wire 135, stoker motor 300, wire 134 and line wire L2. In addition, a holding circuit for relay 75 is completed as follows: secondary winding 117, wire 129, pivot 54, arm 51, contact 57, contact 58, wire 131, switch arm 81b, contact 84, contact 82, wire 86, winding 78, wire 118 and secondary winding 117. Also, the rotation of switch blade 81b in a clockwise direction by armature 79 results in a similar clockwise motion of armature extension 79a thereby causing valve 91 to plug insert 35 and to disengage valve 92 from insert 63 to thereby permit the liquid collected in chamber 60 to drain back into sump 13. Drainage of liquid from chamber 60 almost immediately causes float 65 to drop far enough to disengage contact 74 from contact 71 and thereby break the circuit by which relay 75 was energized. However, due to the holding circuit previously traced, the relay remains engaged. Since plug or valve 91 is now preventing liquid from flowing through insert 35 from chamber 30, liquid accumulates in chamber 30. Assuming that the liquid capacity of chamber 30 has been adjusted by displacement plug 100 so that 20 cc., for instance, of liquid are required to move float 50 sufficiently to disengage contact 57 from 58, it is noted that it will take five minutes for sufficient fluid to accumulate in 30, at the aforementioned rate of 4 cc., per minute, to break the aforementioned holding circuit. When this holding circuit is broken, and with contacts 74 and 71 disengaged, the consequent deenergizing of relay 75 permits spring 87 to disengage contacts 84—82 and 85—83 and to restore valve 92 into flow preventing relation with insert 63 and to open insert 35 for flow out of chamber 30. Further, the deenergizing of relay 75 also opens the circuit which caused operation of the stoker motor 300, hence the stoker operation is now stopped after five minutes of operation.

Although chamber 60 was empty of fluid, due to the separation of valve means 92 and insert 63, upon deenergizing the relay and restoring the valve means to the position shown, the 20 cc. of liquid in chamber 30 pours into chamber 60 in addition to the constant flow of 4 cc. per minute permitted into chamber 60 through chamber 30 previously described. Because of the 20 cc. of liquid dumped into chamber 60, only 180 cc. now remain to be provided at the rate of four cubic centimeters per minute. Therefore, in 45 minutes the 200 cc. of liquid required to lift float 65 sufficiently to engage contacts 74 and 71 should be provided. Upon these switch contacts again being engaged, the relay 75 is energized in the same manner as previously related and the energization of the relay again results in operation of the stoker motor, the dumping of liquid from chamber 60 and the accumulation of liquid in chamber 30. It is thus noted that the time required for sufficient liquid to accumulate in chamber 60 to cause engagement of contacts 74 and 71 controls the "off" period of the stoker motor and the time required for sufficient liquid to accumulate in chamber 30 to disengage contacts 57 and 58 controls the "holdfire" or minimum "on" time of the stoker motor. It is also noted that after the first cycle of the timing means, the effective capacity of chamber 60, from the timing standpoint, is its total adjusted capacity less the adjusted capacity of chamber 30, as above described.

In the aforementioned discussion, it has been assumed that the thermostat was satisfied and its contacts were open. If the temperature affecting the thermostat should now drop sufficiently to engage blade 126 with contact 124, an energizing circuit for relay 75 is completed as follows: secondary winding 117, wire 128, bimetal 125, blade 126, contact 124, resistor 122, wire 121, wire 119, wire 86, winding 78, wire 118 and secondary winding 117. However, due to resistor 122, sufficient current to pull in the relay 75 cannot flow through the aforementioned circuit, hence the relay is not pulled in. Upon a further drop in temperature, so that blade 127 engages contact 120, resistor 122 is shunted out of the aforementioned circuit and sufficient current can then flow through the circuit to energize the relay and pull in armature 79.

Energizing relay 75 by the thermostat establishes the same holding circuit previously related and operates valves 91 and 92 in the manner previously described. If, after a short period, the temperature affecting the thermostat should rise sufficiently to disengage blade 127 from contact 120, but leaves blade 126 in engagement with 124, the thermostat circuit thus remaining, which includes resistor 122, is adequate to maintain relay 75 energized once it is pulled in. If contacts 126 and 174 should be disengaged, by rising temperature, before a normal "hold-fire" operation would be completed, or before liquid would accumulate in chamber 30 sufficiently to open contacts 57 and 58, the relay 75 will remain energized until the said contacts are separated and the "hold-fire" circuit is then opened. However, should the thermostat contacts remain in engagement for longer than a normal "hold-fire" operation, relay 75 remains energized and liquid continues to be poured into chamber 30 by siphon 36. This is taken care of by overflow opening 38, located just slightly above the float operating liquid level of chamber 30, which prevents the accumulation of liquid in chamber 30 beyond that necessary to operate float 50 by discharging the excess into drain 24. As valve 92 remains separated from insert 63 during the relay energized period, no liquid can accumulate in chamber 60.

Upon the thermostat finally being satisfied and its contacts disengaged, the thermostat controlled initial energizing circuits for the relay 75 are broken and, as before noted, since contacts 57 and 58 were disengaged by the high liquid level in chamber 30, hence the holding circuit is also broken. Relay 75 therefore drops out and stops stoker motor 300. Additionally, valve 92 plugs insert 63 and 91 disengages from insert 35 to thereby dump the liquid in chamber 30 into chamber 60 and permit the liquid flow through siphon 36 to accumulate in chamber 60 to thus start another "off" period before a "hold-fire" operation can be had. It is thus noted that regardless of whether the stoker operation is caused by the present timing means or by a thermostat, the operation will be followed by an "off" period of a predetermined length. Further, the thermostat can assume control of the stoker motor at any time, but a "hold-fire" operation can never take place before a predetermined time has elapsed after the last stoker operation. In addition, because a holding circuit is established through the timing means whenever the relay is energized, any demand for heat from the thermostat sufficient to pull in the relay will cause operation of the stoker for a minimum time corresponding to the time of a "hold-fire" operation. In addition, stepless adjustment of the timing periods for both the "on" and the "off" portion of the cycle is easily obtainable by adjustment of the displacement plugs 100, 105 and 106. Thus, the present hydraulic timing means and the circuits controlled thereby are ideally suited for controlling solid fuel stokers and the like. Moreover, the principles involved in the present invention can be readily incorporated in other mechanisms, a specific example of which follows.

Figures 7 and 8

Figures 7 and 8 disclose the present invention as it may be carried out by use of mechanical timer means rather than hydraulic timer means.

The energization of stoker motor 300, Figure 8, is controlled by a relay 210 generally similar to relay 75. Relay 210 comprises a winding 225 and switch arms 238 and 251 carrying contacts 237 and 252, respectively, these contacts being engageable with stationary contacts 236 and 253, respectively. Switch arms 238 and 251 are connected together for simultaneous operation by armature 250, an extension of which armature serves to operate a pivoted lever 256.

Thermostat 211, is a conventional device and comprises movable contact blades 231 and 232 engageable with contacts 230 and 227, respectively. Contact means 231 and 230 are the first to make and the last to break. As before, a thermostat embodying a single set of contacts may be used if desired.

Timer mechanism 214 comprises an electric motor 272 for selectively operating cam means 283 or cam means 293. Motor 272 may be of any suitable sort, preferably self-starting, synchronous, and of a type that may be stalled without injury, and operates through a speed reducing gear train comprising pinion 273, gear 274, pinion 275, and gear 276. Gear 276 is directly coupled to a pinion gear 277 which drives gears 278 and 279 in a similar direction. Although gears 278 and 279 may be driven at any desired speed, one revolution per hour has been found to be satisfactory for these gears. Gear 278 is freely rotatable on a shaft 280 and gear 279 is freely rotatable on a shaft 290, shafts 280 and 290 being journaled in plates 270 and 271 and also being axially movable relative to said plates and said gears. Shaft 280 has a right-hand extended portion 284 and shaft 290 has a similar extended portion 294, these extended portions being useful for a purpose to be described. A disk of suitable friction material such as compressed cork or the like, is attached to gear 278 concentric with shaft 280, and a similar disk 282 is attached to cam 283 for frictional engagement therewith. Obviously, any suitable friction material and any conventional combination of friction surfaces may be used.

Cam 283 is of a generally circular shape and includes an extensive dwell portion 286 terminated by an abutment edge 287. Abutment edge 287 is adapted to engage a stop pin 288 which is adjustably secured along the extent of an arcuate slot 289 in plate 270 and serves to limit the counterclockwise rotation of cam 183. Cam 283 is securely attached to shaft 280, care being taken to provide for sufficient axial movement of shaft 280 to permit engagement and disengagement of friction surfaces 281 and 282. A light coil spring 285 is arranged concentric with shaft 280 and is attached to plate 270 and cam 283 in a manner to bias cam 283 in a clockwise direction, (Figure 7) so that abutting edge 287 of cam 283 will be held against stop 288 unless the said cam be driven in the opposite direction. If desired, spring 285 may also exert a slight bias tending to disengage friction surfaces 281 and 282.

Cam 283 operates lever 240, pivoted at 268, and carrying a contact 241 engageable with a stationary contact 242, these contacts being normally in engagement but being separated when cam 283 is revolved counterclockwise sufficiently for dwell portion 286 to engage lever 240. Contacts 241 and 242 control a holding circuit for relay 210 in a manner to be described.

A friction disk 291, similar to 281, is attached to gear 279 and is engageable with a similar disk 292 carried by cam 293. Cam 293 is also of generally circular shape but includes a very short lever operating dwell portion 297, said dwell portion having an abrupt abutment edge on its clockwise extreme. Cam 293 is securely attached to shaft 290, provision being made for shaft 290 to move axially sufficient to disengage or engage surfaces 291 and 292, as above. Likewise, an adjustable stop 298 is secured in an arcuate slot 299 in plate 270, the stop 298 limiting the clockwise rotation of cam 293. In a manner similar to that above described, a light coil spring 295 is arranged concentric with shaft 290 and attached to plate 270 and cam 293 in a manner to rotate cam 293 to its clockwise extreme whenever friction disks 291 and 292 are separated, and may also exert a slight bias tending to separate the said disks.

Cam 293 is provided for operating a lever 245, pivoted at 267, and carrying a contact 246 engageable with a stationary contact 247. Contacts 246 and 247 are normally open but are movable into engagement by dwell portion 297 of cam 293 when it engages lever 245. Also, in the event that manual operation of stoker motor 300 is desired, a knob 213 is provided for rotating cam 269 into engagement with lever 245 to thereby force contact 246 into engagement with contact 247. The stop 296 serves to limit the rotation of cam means 269. Contact means 246 and 247, engageable by action of either manual means 213 or operation of cam means 293, serves to initiate energization of relay 210, in a manner to be described.

For controlling the clutching means associated with cams 283 and 293, lever 263 is mounted in a manner to engage either extension 284 of shaft 280 or extension 294 of shaft 290. Lever 263 is secured by means such as a rivet 264 to a lever 260 pivoted at 262 to plate 270 at a point intermediate the said shaft extensions 284 and 294. Lever 260 is pivoted at 261 to a link 259 which is in turn pivoted at 258 to lever 266. Lever 266 is pivotally mounted at 257 and is arranged to be simultaneously operated with switch arms 238 and 251 by armature 250, as previously related. A spring 265 is provided for biasing lever 263 in a clockwise direction so that friction disks or plates 291—292 are engaged and plates 282—283 are disengaged, although this spring may be dispensed with if a sufficiently strong spring (not shown) is used in relay 210.

The electrical circuits controlled by contacts 241—242, 246—247, and thermostat 211 are preferably low voltage, the low voltage source being a transformer 212. Transformer 212 comprises a primary winding 220 and a secondary winding 223, the primary winding 220 being connected to line wires L1 and L2 by wires 221 and 222, respectively. For a better understanding of this modification of the present invention, its operation will now be discussed.

*Operation*

With the present apparatus, as shown in Figure 7, placed in operation, transformer 212 is energized by a circuit previously traced. Motor 272 is placed in operation by suitable connections, not shown, and the stoker motor 300 is not operating due to the open contacts of relay 210. Further, as the contacts of thermostat 211 are open, it may be assumed that the temperature affecting the said thermostat is relatively high. With relay 210 deenergized, relay armature 250 is in a raised position, lever 266 is rotated to a counterclockwise extreme, lever 263 is urged away from shaft extension 284 by the efforts of spring 265, and friction surfaces 281 and 282 are therefore separated. However, lever 263 is acting on shaft extension 294 with sufficient force to engage friction surfaces 291 and 292, hence motor 272 is now effective through its gear train to drive cam means 293 in a counterclockwise direction. As gears 278 and 279 are assumed to be rotating at one revolution per hour, it may be further assumed that it will take cam 293 approximately fifty-five minutes to revolve sufficiently for dwell portion 297 to move from stop pin 298 and engage lever 245 sufficiently to force contact 246 into engagement with stationary contact 247. Upon this engagement taking place, relay 210 is energized by the circuit: transformer secondary winding 223, wire 244, pivot 267, arm 245, contact 246, contact 247, wire 248, winding 225 of relay 210, wire 224 and secondary winding 223. The resulting energization of winding 225 of relay 210 forces armature 250 downward and pulls blades 238 and 251, carrying contacts 237 and 252, respectively, into engagement with their respective stationary contacts 236 and 253. With the relay thus pulled in, a holding circuit for the same is established by the circuit: transformer secondary 223, wire 234, wire 239, pivot 268, arm 240, contact 241, contact 242, wire 243, switch blade 238, contact 237, contact 236, wire 235, wire 249, winding 225, wire 224 and secondary winding 223. In addition, the stoker motor 300 is energized by the circuit: line wire L2, wire 254, contact 253, contact 252, switch blade 251, wire 255, motor 300, wire 256 and line wire L1.

The downward motion of armature 250 of relay 210 not only effects the closing of the switch contacts of the relay but also results in pivoting lever 266 to its clockwise extreme, thereby causing lever 263 to move against the force of spring 265 and engage shaft extension 284 sufficiently to clutch cam 283 to gear 278, so that motor 272 will now be effective to drive cam 283 in a counterclockwise direction. At the same time, lever 263 is moved from engagement with extension 294, thereby permitting a declutching of cam 293 from gear 279 this permitting spring 295 to restore cam 293 to its initial position against stop 298 as shown.

Upon cam 283 rotating counterclockwise from its initial position, with edge 287 against stop pin 288, sufficiently for dwell 286 to engage lever 240 and move contact 241 out of engagement with contact 242, the previously mentioned holding circuit for the relay 210 is broken. Since contacts 246 and 247 were disengaged by the restoration of cam 293 to its initial position, relay 210 is now deenergized, its contacts are opened, and lever 266 is rotated back to its counterclockwise extreme. The opening of contacts 252 and 253, as will be noted, deenergizes motor 300 and thus stops the operation of the stoker.

The deenergizing of the relay 210 and the consequent counterclockwise pivoting of lever 266 serves to again clutch cam 293 to gear 279 and to declutch cam 283 from gear 278, the declutching of cam 283 from gear 278 permitting spring 285 to restore the cam 283 to its original position, with abutting edge 287 against stop 288.

Further, it will be noted that this is the position of the apparatus at the beginning of the cycle, and, assuming that it took about forty-five minutes for cam 293 to cause engagement of contacts 246 and 247 and that it took about five minutes for cam 283 to open contacts 241 and 242, an "off" and "hold-fire" operation of the stoker has taken place in fifty minutes and the cycle is about to be repeated. Obviously, the times given are only illustrative examples.

If the temperature affecting thermostat 211 should now drop sufficiently for contact means 230 and 231 to engage, relay 210 is energized by the circuit: secondary winding 223, wire 234, wire 233, bimetal 239 of the thermostat, blade 231, contact 230, resistor 229, wire 228, wire 226, wire 249, winding 225, wire 224, and secondary winding 223. However, due to the resistance of resistor 229, insufficient current is passed through this circuit to pull in relay 210.

Upon a further drop in temperature, contact means 232 and 227 of the thermostat engage and serve to shunt resistor 229 by wire 228a, thereby permitting sufficient current to pass through the aforementioned circuit to pull in the relay 210. The pulling in of relay 210, as before noted, causes energization of the stoker motor 300 and likewise causes a declutching of cam 293 from gear 279 and a clutching of gear 283 to gear 278. Also, the aforementioned holding circuit through contacts 241 and 242 and relay contacts 236 and 237 is again established. As before, approximately five minutes after energizing relay 210, cam 283 will be rotated sufficiently for dwell portion 286 to engage lever 240 and force contact 241 out of engagement with contact 242, thereby breaking the aforementioned holding circuit.

However, if the room temperature is still not satisfied and the thermostat contacts are still made, the relay remains energized by the aforementioned thermostat control circuit. Cam 283 therefore continues to operate in a counterclockwise direction. As the operation of the stoker will eventually cause a temperature rise in the space being heated, contacts 227 and 232, being the last to make, will normally be the first to open, contacts 230 and 231, however, remaining in engagement. The opening of contacts 227 and 232 breaks the shunt circuit around resistor 229; hence the only remaining energizing circuit for the relay 210 includes the resistor 229. Although the value of resistor 229 was such that insufficient current could be passed through the circuit to pull in the relay, sufficient current can be passed through this circuit to maintain the relay in engagement, once it is pulled in. Therefore, the relay remains energized and operation of the stoker continues. Should this operation continue for a sufficient length of time, the leading edge or rise portion of dwell 286 will eventually come in contact with stop 288 and thereby prevent further rotation of cam 283. This will cause either slipping of friction surfaces 281 relative to 282 or cause a stalling of motor 272. As before mentioned, motor 272 is of such character that it may be stalled without harm and, due to the very low rate of motion, slippage of clutch surfaces 281 and 282 may take place without harm. As a matter of practice, it is seldom that thermostat 211 will cause operation of stoker motor 300 for a sufficient length of time for cam 283 to be rotated to its counterclockwise extreme.

Upon a sufficient rise in the temperature affecting thermostat 211, contacts 230 and 231 disengage and, due to contacts 241 and 242 being disengaged, relay 210 is deenergized and the stoker is stopped. In addition, as before noted, the deenergizing of relay 210 again causes cam 293 to be clutched to gear 279 and cam 283 to be declutched from gear 278, thereby permitting the cam 283 to be restored to its initial position. Cam 293, being again clutched to gear 279, will now start rotating and must rotate for approximately a forty-five minute period before contacts 246 and 247 can be engaged to again initiate a "hold-fire" operation of the stoker, hence it is seen that a predetermined "off" period must follow either a thermostat controlled operation of the stoker or a timer initiated "hold-fire" operation of the same.

It is further evident that once the relay 210 is energized by action of thermostat 211, the stoker will be operated for the length of time of a "hold-fire" operation even if the thermostat contact immediately breaks, this being due to the establishment of the holding circuit through contacts 236—237 and 241—242. Because of this characteristic, undue short cycling of the stoker is prevented and even the simplest of thermostats may be used successfully with the present apparatus.

While two specific modifications of the present invention have been disclosed, many other substitutions and equivalents will be obvious to those skilled in this art, upon a study of the present disclosure, hence it is intended that the scope of this invention be determined only by the appended claims.

I claim:

1. Control apparatus for a motor comprising, in combination; a relay for controlling said motor, said relay including a movable armature; a holding circuit for said relay controlled by said armature; temperature responsive means connected in controlling relation to said relay; and timer controlled apparatus also connected in controlling relation to said relay, said timer controlled apparatus comprising a timer, a first switch for energizing said relay, a second switch in said holding circuit for deenergizing said relay, and means controlled by said movable armature for selectively conditioning said timer to cause operation of said first or second switch by said timer.

2. Control apparatus for a power device comprising, in combination; a relay for controlling said power device, said relay including a movable armature actuated switch; temperature responsive means connected in controlling relation to said relay; a holding circuit for said relay controlled by said armature actuated switch; and control apparatus comprising a first normally closed switch and a second normally open switch for controlling said relay, a timer for operating one or the other of said switches to thereby control said relay, and means controlled by operation of said relay for changing the timer operation for shifting the control of said timer from one of said switches to the other of said switches, one of said switches being connected for causing energization of the said relay and the other switch being connected for controlling the said holding circuit jointly with said armature actuated switch.

3. A stoker control apparatus comprising, in combination, a motor; a relay for controlling said motor, said relay including a movable armature carried switch; a holding circuit for said relay controlled by said armature carried switch; and control apparatus comprising a first normally closed switch and a second normally open switch, a timer for operating one or the other of said switches to thereby control said relay, and means controlled by operation of said relay for altering the timer operation for shifting the control of said timer from one of said switches to the other of said switches, one of said switches being connected for causing energization of the said relay and the other switch means being connected for controlling the said holding circuit jointly with said armature carried switch.

4. Control apparatus comprising, in combination, a relay, said relay including a movable armature actuated switch, a holding circuit for said relay controlled by said armature actuated switch, control apparatus comprising a first normally closed switch and a second normally open switch each electrically connected to said relay for controlling said relay, a timer for operating one or the other of said switches to thereby control said relay, and means controlled by operation of said relay for altering the timer operation for shifting the control of said timer from one of said switches to the other of said switches, one of said switches being connected for causing energization of the said relay and the other switch being connected for controlling the said holding circuit jointly with said armature actuated switch.

5. Control apparatus comprising a relay having a movable armature, a timer, means operably associated with and movable simultaneously with said armature for controlling said timer, a first timer operated switching means electrically connected to said relay and cooperable with said relay for controlling a holding circuit for said relay, a second timer operated switching means electrically connected to said relay in circuit controlling relation therewith, said timer having means for operating either said first or said second switching means, and means operable by said first mentioned means for determining which of said switching means is to be operated by said operating means.

6. Control apparatus comprising in combination, a timer having means movable at a predetermined rate, a first switch positioned to be actuated by said movable means, a second switch positioned to be actuated by said movable means, a relay in series with each of said switches and selectively arranged to be controlled by the said first and second switches, and mechanism operated by said relay means for selectively conditioning said timer to operate either said first switch or said second switch.

7. Control apparatus for a power operated device comprising, in combination, a relay having switches capable of controlling energization of said device and an electrical holding circuit for said relay, a timer for controlling said relay including a first switch for controlling an energizing circuit for said relay means, a second switch for cooperating with said relay means for controlling said holding circuit, said timer having substantially constant speed power means, first means actuatable by said power means for operating the first switch means, second means actuatable by said power means for operating said second switch means, and means operable by said relay means for selectively conditioning said timer to control operation of said first or said second actuatable means.

8. Control apparatus comprising a pair of switches, individually operable means for actuating said switches, a device controlled by at least one of said switch means, power means for operating said switches, clutch means for selectively and operatively relating said power means to said operable means for said switches for actuating one or the other of said switches, and means arranged to be operated by said device for operating said clutch means.

9. Stoker control apparatus comprising, in combination, a relay for controlling a stoker motor, a thermostat arranged to control said relay, and a timer including a pair of switches for also controlling said relay, said timer including means for operating said switches in a manner to provide predetermined "on" and "off" periods of said motor controlling relay when said thermostat is not controlling the said relay, said switches being operable to provide at least the same length of "off" period after thermostat operation of the relay as occurs after an "on" operation of the relay.

10. Control apparatus comprising, in combination, an electromagnetic means, a first switch means, a second switch means, a cam means for operating said first switch means, another cam means for operating said second switch means, power means for driving said cam means, means including clutch means for connecting said power means in driving relation to one or the other of said cam means, and means operable by said electromagnetic means for controlling said clutch means.

11. Control apparatus comprising, in combination, an electromagnetic means, a first switch means, a second switch means, a cam means for operating said first switch means, another cam means for operating said second switch means, power means for driving either of said cam means in one direction, spring means for moving each of said cam means in an opposited direction, stop means for limiting the movement of each of said cam means, means including clutch means for connecting said power means in driving relation to one or the other of said cam means for operating the said cam means in said one direction and permitting the said spring means to operate the other of said cam means in said opposite direction, and means operable by said electromagnetic means for controlling said clutch means.

12. Control apparatus comprising in combination, an electromagnetic means, a first switch means, a second switch means, said switch means being connected in controlling relation to said electromagnetic means, a first hydraulic means for operating said first switch means, a second hydraulic means for operating said second switch means, liquid supply means for said hydraulic means, valve means for controlling said first and second hydraulic means, and means operable by said electromagnetic means for controlling said valve means.

13. Control apparatus comprising, in combination, an electromagnetic means, a first switch means, a second switch means, a chamber and float means for operating said first switch means, another chamber and float means for operating said second switch means, means for filling either of said chamber means for operating the respective float means in one direction, means for draining either of said chamber means for restoring the respective float means to its original position, and means operable by said electromagnetic means for causing the filling of one chamber means and the emptying of the other chamber means each time the electromagnetic means is energized or deenergized.

14. Timing apparatus comprising, in combination, a liquid reservoir; a first means located relatively high and arranged to discharge liquid at a constant rate of flow; a chamber arranged below said first means for receiving said flow, float means in said chamber, switch means operable by said float means when liquid rises to a predetermined level in said chamber, drain means in said chamber, and valve means for controlling said drain means; second chamber means arranged below said first named chamber means for receiving liquid drained from the said first chamber means, float means in said second chamber means, switch means operable by said latter float means when the liquid in said second chamber rises to a predetermined level, means for draining liquid from said second chamber means into said reservoir, and valve means for controlling said draining means; relay means connected to be controlled by both of said switch means, means operable simultaneously with said relay means for operating both of said valve means, said valve means being arranged to close one drain and open the other; and means for lifting liquid from said reservoir to said first means, said lifting means comprising a rotatable disk arranged to dip into liquid in said reservoir and carry the same on its periphery to a point above said first means, and means for scraping liquid from said disk and diverting it to said 15. Control apparatus comprising, in combination, relay means capable of controlling a device and an electrical holding circuit, means for controlling said relay means including a first switch means for controlling an energizing circuit for said relay means, a second switch means for cooperating with said relay means for controlling said holding circuit, means for supplying liquid at a constant rate of flow, first means responsive to a predetermined quantity of said flow for operating said first switch means, second means responsive to a predetermined quantity of said flow, and flow control means operable simultaneously with said relay means for selectively controlling said first and second quantity responsive means.

16. Control apparatus comprising a relay having a movable armature, means movable simultaneously with said armature, a first switching means connected to cooperate with said relay for controlling a holding circuit for said relay, second switching means connected in circuit controlling relation to said relay, liquid actuated means for operating either said first or said second switching means, and flow control means operable by said simultaneously movable means for determining which of said switching means is to be operated by said liquid actuated means.

17. Timing apparatus comprising, in combination, a plurality of liquid actuated switch means, liquid measuring means for actuating said switch means, relay means controlled by each of said switch means, and valve means operated by said relay means for cyclically controlling said liquid measuring means.

18. Control apparatus comprising, in combination, a plurality of sequentially operable hydraulic means, switch means arranged to be actuated by said hydraulic means, relay means controlled by said switch means, valve means for simultaneously controlling said plurality of hydraulic means, and means for operating said valve means in conjunction with said relay means, said valve means and said switch means being so correlated that said hydraulic means and said relay means mutually control each other to cause cyclic operation thereof.

19. Timing apparatus comprising, in combination, a plurality of sequentially operable hydraulic actuating means, a normally open switch means arranged to be operated by one of said hydraulic means, a normally closed switch means arranged to be operated by another of said hydraulic means, relay means connected for control by said switch means, and means for simultaneously controlling said plurality of hydraulic actuating means arranged to be operated simultaneously with said relay.

JOSEPH O. THORSHEIM.

REFERENCES CITED

The following references are of record in the file of this patent:

UNITED STATES PATENTS

| Number | Name | Date |
| --- | --- | --- |
| 1,659,582 | Wiggert | Feb. 21, 1928 |
| 1,795,013 | Denman | Mar. 3, 1931 |
| 1,826,477 | Olpp | Oct. 6, 1931 |
| 1,922,251 | Malpass | Aug. 15, 1933 |
| 2,162,116 | Peltz | June 13, 1939 |
| 2,221,189 | Hodge | Nov. 12, 1940 |
| 2,252,154 | Baak | Aug. 12, 1941 |
| 2,420,043 | Johnson | May 6, 1947 |

FOREIGN PATENTS

| Number | Country | Date |
| --- | --- | --- |
| 494,166 | Great Britain | Oct. 20, 1938 |

Certificate of Correction

Patent No. 2,529,116 November 7, 1950

JOSEPH O. THORSHEIM

It is hereby certified that error appears in the printed specification of the above numbered patent requiring correction as follows:

Column 10, line 40, for "cam 183" read *cam 283*; column 16, line 21, for "opposited" read *opposite*; column 17, line 13, after the word "said", second occurrence, insert *first means*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*